US012152543B1

(12) United States Patent
Hertlein et al.

(10) Patent No.: US 12,152,543 B1
(45) Date of Patent: Nov. 26, 2024

(54) USE OF CYLINDER DEACTIVATION TO PREVENT DIESEL ENGINE RUNAWAY

(71) Applicant: PACCAR INC, Bellevue, WA (US)

(72) Inventors: Nick Hertlein, Bellingham, WA (US); Maarten Meijer, Anacortes, WA (US); Steve Ciatti, Bellingham, WA (US); Charles Wayne Reinhardt Swart, Bellingham, WA (US)

(73) Assignee: PACCAR Inc, Bellevue, WA (US)

( * ) Notice: Subject to any disclaimer, the term of this patent is extended or adjusted under 35 U.S.C. 154(b) by 0 days.

(21) Appl. No.: 18/464,089

(22) Filed: Sep. 8, 2023

(51) Int. Cl.
*F02D 17/00* (2006.01)
*F02D 17/04* (2006.01)
*F02D 29/02* (2006.01)

(52) U.S. Cl.
CPC ............. *F02D 17/04* (2013.01); *F02D 29/02* (2013.01); *F02D 2200/1002* (2013.01); *F02D 2200/101* (2013.01); *F02D 2700/056* (2013.01)

(58) Field of Classification Search
CPC ............... F02D 41/042; F02D 41/0055; F02D 41/0077; F02D 41/221; F02D 31/006; F02D 2041/0017; Y02T 10/40
See application file for complete search history.

(56) References Cited

U.S. PATENT DOCUMENTS 3,855,880 A * 12/1974 Ishimaru ............. F16H 61/0021 477/162
4,141,333 A * 2/1979 Gilbert .................... F02D 17/02 123/90.32
6,257,194 B1 * 7/2001 Kerns ....................... F01L 1/34 123/198 D
11,313,301 B2 * 4/2022 Webb .................... F01N 3/2066
2006/0150945 A1 * 7/2006 Adams .................... F02D 13/06 123/198 D
2014/0261314 A1 * 9/2014 Ross .................. F02D 13/0242 123/345
2021/0239204 A1 * 8/2021 Jahns ................. F16H 61/0213

* cited by examiner

*Primary Examiner* — Phutthiwat Wongwian
*Assistant Examiner* — Sherman D Manley
(74) *Attorney, Agent, or Firm* — Seed IP Law Group LLP

(57) ABSTRACT

A method includes detecting a diesel engine runaway event in a diesel engine and, in response to detecting the diesel engine runaway event, deactivating all cylinders in the diesel engine such that no combustion occurs in any cylinders of the diesel engine and no cylinders of the diesel engine produce power, wherein deactivating the cylinders of the diesel engine includes mechanically decoupling a camshaft of the diesel engine from inlet valves of the cylinders of the diesel engine, and wherein deactivating cylinders of the diesel engine prevents flow of air from an intake manifold into combustion chambers of the cylinders.

15 Claims, 2 Drawing Sheets

USE OF CYLINDER DEACTIVATION TO PREVENT DIESEL ENGINE RUNAWAY

BACKGROUND

Technical Field

The present disclosure relates to the prevention or interruption of diesel engine runaway using cylinder deactivation.

Description of the Related Art

A variety of combustible fuels, such as hydrocarbon fuels, both liquid and gaseous, can be used to power a diesel engine. If a combustible fuel or other combustible substance unintentionally accesses a running diesel engine, such as due to a leak (e.g., a fuel leak at an injector, a faulty injector, an oil leak from a turbocharger, a motor oil leak through a valve stem seal, etc.), then the unintended introduction of the combustible fuel can increase the speed of the diesel engine. In some cases, increasing the speed of the engine can accelerate the unintended introduction of the combustible fuel or other combustible substance, such as when the combustible fuel or other combustible substance enters through the inlet manifold (e.g., where the combustible fuel or other combustible substance is gaseous and enters the engine through the air intake). As a result, diesel engines can run and/or accelerate in an uncontrolled manner, presenting a safety hazard, as the operator no longer has control of the engine's speed or output which can cause catastrophic mechanical damage to the engine or an inability to stop the engine. Diesel engine runaway events are risks particularly when a diesel engine is idling or starting up and not in gear.

BRIEF SUMMARY

A method may be summarized as comprising: detecting a diesel engine runaway event in a diesel engine; and in response to detecting the diesel engine runaway event, deactivating all cylinders in the diesel engine such that no combustion occurs in any cylinders of the diesel engine and no cylinders of the diesel engine produce power, wherein deactivating the cylinders of the diesel engine includes mechanically decoupling a camshaft of the diesel engine from inlet valves of the cylinders of the diesel engine, and wherein deactivating cylinders of the diesel engine prevents flow of air from an intake manifold into combustion chambers of the cylinders.

A method may be summarized as comprising: detecting a diesel engine runaway event in a diesel engine; and in response to detecting the diesel engine runaway event, deactivating cylinders of the diesel engine. Deactivating cylinders of the diesel engine may include deactivating all cylinders in the diesel engine such that no combustion occurs in any cylinders of the diesel engine and no cylinders of the diesel engine produce power. Deactivating cylinders of the diesel engine may include mechanically deactivating the cylinders of the diesel engine. Deactivating cylinders of the diesel engine may include mechanically decoupling a camshaft of the diesel engine from inlet valves of the cylinders of the diesel engine. Deactivating cylinders of the diesel engine may include mechanically decoupling a camshaft of the diesel engine from inlet valve seats of the cylinders of the diesel engine. Deactivating cylinders of the diesel engine may include deactivating solenoid valves of the cylinders of the diesel engine.

The method may further comprise: prior to detecting the diesel engine runaway event in the diesel engine, deactivating solenoid valves of a subset of the cylinders of the diesel engine to increase a temperature of an exhaust gas leaving the diesel engine. Deactivating cylinders of the diesel engine may prevent flow of air into combustion chambers of the cylinders. Deactivating cylinders of the diesel engine may prevent flow of air into combustion chambers of the cylinders at openings in walls of the combustion chambers. Deactivating cylinders of the diesel engine may prevent flow of air from an intake manifold into combustion chambers of the cylinders. Detecting a diesel engine runaway event in a diesel engine may include an engine control unit comparing a torque requested of the diesel engine to a torque generated by the diesel engine. Detecting a diesel engine runaway event in a diesel engine may include an engine control unit comparing an expected speed of the diesel engine to an actual current speed of the diesel engine. Detecting a diesel engine runaway event in a diesel engine may include an engine control unit checking an idle speed of the engine. The method may further comprise, in response to detecting the diesel engine runaway event, indicating to a driver that the diesel engine runaway event has been detected and that cylinders of the diesel engine have been deactivated.

A heavy-duty truck may be summarized as comprising: a diesel engine; and an engine control unit configured to detect a diesel engine runaway event in the diesel engine and, in response to detection of the diesel engine runaway event, deactivate cylinders of the diesel engine. The engine control unit may be configured to, in response to detection of the diesel engine runaway event, deactivate all cylinders in the diesel engine such that no combustion occurs in any cylinders of the diesel engine and no cylinders of the diesel engine produce power. The engine control unit may be configured to, in response to detection of the diesel engine runaway event, mechanically decouple a camshaft of the diesel engine from inlet valves of the cylinders of the diesel engine. The engine control unit may be configured to, in response to detection of the diesel engine runaway event, prevent flow of air from an intake manifold into combustion chambers of the cylinders.

DETAILED DESCRIPTION

Figure 1:
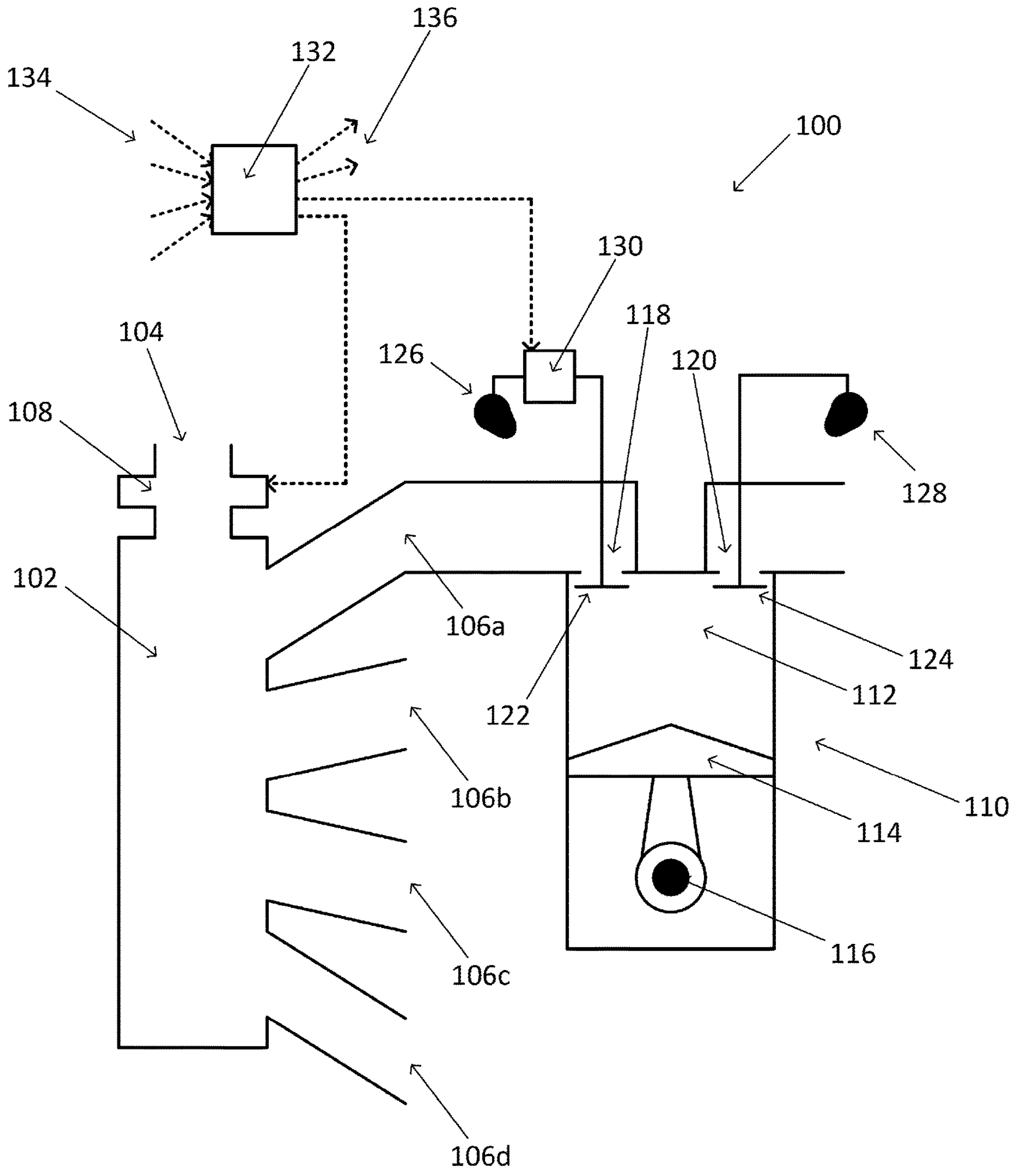
FIG. 1 illustrates components of a diesel vehicle.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with the technology have not been shown or described in detail to avoid unnecessarily obscuring descriptions of the embodiments.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. Also, as used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The use of ordinals such as first, second and third does not necessarily imply a ranked sense of order, but rather may only distinguish between multiple instances of an act or structure.

In a diesel engine, a fuel is ignited within a cylinder as a result of high air temperature in the cylinder caused by compression of the air by a piston reciprocating within the cylinder. Modern diesel engines include plural pistons, each reciprocating within a respective cylinder. Most diesel vehicles include an "inlet manifold" or an "intake manifold," which generally supplies air to the cylinders. Generally, an intake manifold includes an inlet, which may be open to the atmosphere or the air surrounding the vehicle, and plural outlets, each coupled to an inlet of a respective cylinder. Thus, an intake manifold splits air flowing into the engine from one source to plural destinations.

A diesel vehicle may be equipped with an air intake shutoff valve, which generally shuts or seals the inlet to the manifold, so that air can no longer be taken into the manifold from the environment surrounding the vehicle. One technique that may be used to attempt to interrupt diesel engine runaway would therefore be to close such an air intake shutoff valve, preventing further unintended and/or undesirable ingestion and combustion of fuel or another combustible substance through the intake manifold. This could be achieved, for example, using a guillotine-type valve. Nevertheless, it has been found that such a technique can be insufficient to prevent or interrupt dangerous overspeed or runaway events. In particular, even after such a guillotine-type valve is shut to seal the inlet to the intake manifold, sufficient air and fuel or another combustible substance may remain in the internal space of the intake manifold to allow the runaway or overspeed event to continue to dangerous and/or destructive speeds. That is, there is capacitance in the system in the form of the reservoir of fuel or other combustible substance and/or air inside the intake manifold. It has been found that even one or two seconds of engine operation under runaway or overspeed conditions can cause damage.

Given the foregoing, one potential solution may be to introduce additional air intake shutoff valves at each of the outlets of the intake manifold, which can be operated individually or collectively to shut off the flow of air and/or fuel or another combustible substance from the intake manifold into the combustion cylinders of the diesel engine. Such valves could shut or seal outlets of the manifold, passages between the outlets of the manifold and the cylinders, or the inlets of the cylinders, so that air and/or fuel or other combustible substance can no longer be taken from the manifold into the cylinders. One technique that may be used to attempt to interrupt diesel engine runaway would therefore be to close such valves, preventing further unintended and/or undesirable ingestion and combustion of fuel or other combustible substance within the cylinders. This could be achieved, for example, using guillotine-type valves or any other suitable types of valves. Nevertheless, such a solution would require introduction of additional components, use of additional physical space, and increase overall cost and complexity of the system.

Diesel engine cylinders typically include intake valves and exhaust valves. The intake valve opens to allow air into the cylinder during an intake stroke or cycle of the respective piston within the cylinder, and otherwise remains closed, and the exhaust valve opens to allow exhaust out of the cylinder during an exhaust stroke or cycle of the respective piston within the cylinder, and otherwise remains closed. Such intake and exhaust valves may be mechanically coupled to and controlled by a respective camshaft, as is generally known in the art, such that a respective cam of the camshaft controls operation (e.g., opening and closing) of the valve. Camshafts may be mechanically coupled to (such as by gears or belts) and controlled by the speed of a crankshaft, which carries the output power from the engine. Thus, historically, in the event of an overspeed or runaway event as described herein, it would have been difficult or impossible to prevent the intake valves from opening, because their opening was mechanically driven by the rotation of the output crankshaft itself.

In recent years, interest has grown in cylinder deactivation ("CDA") technologies. Such technologies introduce additional components into diesel engines, to allow a camshaft to be mechanically decoupled from the intake valves of individual or selected cylinders of the diesel engine, thus disabling engine valves for those individual or selected cylinders and disabling (that is, preventing operation of) such cylinders themselves by preventing flow of air and/or fuel or other combustible substance into the cylinders. Such CDA technologies may be actuated hydraulically and/or electrically, such as by use of an electrically-powered solenoid that acts to mechanically disconnect or decouple the camshaft from the intake valve(s). Such a solenoid may include an axially-movable ferromagnetic plunger inside an electrified coil. In this sense, CDA technologies may convert traditional intake valves into solenoid valves.

Such CDA technologies are of interest in particular for use in improving compliance with new stringent fuel economy and emissions standards, such as new ultra-low NOx standards. The use of CDA in such applications is described, for example, in U.S. Pat. No. 11,313,301. In particular, in such applications, CDA can be used to disable operation of one or more of the cylinders of a diesel engine, thereby increasing the temperature of exhaust gases produced by the remaining operating cylinders, which can improve performance of exhaust after-treatment systems, especially in reducing NOx emissions. Notably, in such applications, CDA would be used, if at all, to disable operation of only a specific number or subset of the cylinders of the diesel engine, and would not be used to disable operation of all of the cylinders of the diesel engine. Thus, such applications, by themselves, do not provide a solution to the problems associated with diesel engine overspeed or runaway as described herein.

Because the additional components of such CDA technologies may be provided for purposes of emissions reduction, however, it may be possible to additionally use and/or leverage them for preventing or interrupting diesel engine runaway or overspeed events without incurring the disadvantages of other techniques described above. In particular, the solenoid valves of such CDA technologies provide a mechanism to directly prevent air flowing from the intake manifold into the combustion chamber of the respective cylinder through the inlet thereof. That is, such a solenoid valve can be used to stop the flow of gases into the combustion chamber at a location as close as is physically possible to the combustion chamber itself, thereby reducing or eliminating the "capacitance" in the system and reducing or eliminating latency in a response to a runaway or overspeed event. In particular, such a solenoid valve can stop the flow of gases into the combustion chamber at the combustion chamber itself, and/or directly at an opening in a wall thereof.

FIG. 1 illustrates a system 100 including a variety of components of a diesel vehicle and its diesel engine. As illustrated in FIG. 1, the system 100 includes an intake manifold 102. The intake manifold 102 includes a single inlet 104 and a plurality of outlets 106*a*, 106*b*, 106*c*, and 106*d*. While the intake manifold 102 has four outlets 106 in the illustrated embodiment, in other embodiments, the intake manifold 102 can have any suitable number of outlets, which generally corresponds to the number of pistons and respective cylinders in the diesel engine. As also illustrated in FIG. 1, the system 100 includes an intake manifold inlet valve 108 at or adjacent to the inlet 104, which is configured to be opened to allow air flow into the manifold 102 through the inlet 104 and to be closed to prevent air flow into the manifold 102 through the inlet 104. In some embodiments, the valve 108 can be a guillotine-type valve or any other suitable type of valve.

In practice, each of the outlets 106 can be coupled to an inlet of a respective cylinder of the diesel engine. For purposes of simplicity, outlet 106*a* is illustrated as being coupled to an inlet of a respective cylinder 110, while outlets 106*b*, 106*c*, and 106*d* are not. All of the features described herein for the outlet 106*a* and the cylinder 110 can apply equivalently for the outlets 106*b*, 106*c*, and 106*d* and the cylinders to which they are coupled. As illustrated in FIG. 1, the cylinder 110 houses a combustion chamber 112 and a piston 114, which can reciprocate back and forth along the length of the cylinder 110 (e.g., up and down in the orientation illustrated in FIG. 1). The piston 114 is mechanically coupled to a crankshaft 116, which carries power away from the cylinder 110. In particular, as combustion occurs in the combustion chamber 112, expansion of the gas in the combustion chamber 112 drives the piston 114 to move through the cylinder (downward as illustrated in FIG. 1) and thereby turn the crankshaft 116. As further illustrated in FIG. 1, the cylinder 110 has an inlet valve 118 at an inlet of the combustion chamber 112 and an outlet valve 120 at an outlet of the combustion chamber 112.

FIG. 1 illustrates that the inlet valve 118 includes an inlet valve seat 122 configured to engage with a surrounding portion of the cylinder 110 at the inlet of the combustion chamber 112 to close and seal the inlet such that gases cannot enter the combustion chamber 112 through the inlet, and to be moved away from the surrounding portion of the cylinder 110 to open the inlet and allow gases to enter the combustion chamber 112 from the manifold 102. Similarly, FIG. 1 illustrates that the outlet valve 120 includes an outlet valve seat 124 configured to engage with a surrounding portion of the cylinder 110 at the outlet of the combustion chamber 112 to close and seal the outlet such that gases cannot exit the combustion chamber 112 through the outlet, and to be moved away from the surrounding portion of the cylinder 110 to open the outlet and allow exhaust gases to exit the combustion chamber 112.

FIG. 1 further illustrates that operation of the inlet valve 118 can be mechanically controlled by a first camshaft 126, such as by mechanical engagement of the first camshaft 126 and the inlet valve seat 122. In normal operation, the first camshaft 126 rotates about its central longitudinal axis. The rotation of the first camshaft 126 and speed and timing thereof can be controlled by the first camshaft 126 being mechanically coupled to the crankshaft 116, such as by gears or belts. That is, combustion in the combustion chamber 112 drives rotation of the crankshaft 116 and provides power through the crankshaft 116, which drives rotation of the first camshaft 126 at a speed based on the speed of the crankshaft 116, thus ensuring proper timing of the opening and closing of the inlet valve 118. Similarly, FIG. 1 further illustrates that operation of the outlet valve 120 can be mechanically controlled by a second camshaft 128, such as by mechanical engagement of the second camshaft 128 and the outlet valve seat 124. In normal operation, the second camshaft 128 rotates about its central longitudinal axis. The rotation of the second camshaft 128 and speed and timing thereof can be controlled by the second camshaft 128 being mechanically coupled to the crankshaft 116, such as by gears or belts. That is, combustion in the combustion chamber 112 drives rotation of the crankshaft 116 and provides power through the crankshaft 116, which drives rotation of the second camshaft 128 at a speed based on the speed of the crankshaft 116, thus ensuring proper timing of the opening and closing of the outlet valve 120.

As further illustrated in FIG. 1, the system 100 includes CDA technology. In particular, the system 100 includes a solenoid or a solenoid actuator 130 that is configured to control mechanical engagement between the first camshaft 126 and the inlet valve seat 122. In particular, when the solenoid actuator 130 is inactive, inactivated, unpowered, or switched off, the first camshaft 126 may be mechanically engaged with the inlet valve seat 122, such that rotation of the first camshaft 126 controls movement of the inlet valve seat 122 to open and close the inlet valve 118, and when the solenoid actuator 130 is active, activated, powered, or switched on, the first camshaft 126 may be mechanically disengaged from the inlet valve seat 122 such that rotation of the first camshaft 126 does not control movement of the inlet valve seat 122 to open and close the inlet valve 118 (and thus the inlet valve 118 remains closed even if the first camshaft 126 continues to turn). In other embodiments, when the solenoid actuator 130 is active, activated, powered, or switched on, the first camshaft 126 may be mechanically engaged with the inlet valve seat 122, such that rotation of the first camshaft 126 controls movement of the inlet valve seat 122 to open and close the inlet valve 118, and when the solenoid actuator 130 is inactive, inactivated, unpowered, or switched off, the first camshaft 126 may be mechanically disengaged from the inlet valve seat 122 such that rotation of the first camshaft 126 does not control movement of the inlet valve seat 122 to open and close the inlet valve 118 (and thus the inlet valve 118 remains closed even if the first camshaft 126 continues to turn).

FIG. 1 further illustrates that the system 100 includes an engine control unit or an engine control module 132, which may be an electronic control unit and include one or more microprocessors or other computing devices. As illustrated in FIG. 1, the engine control unit 132 is configured to receive a plurality of signals 134 from a respective plurality of sensors within the diesel vehicle and/or its diesel engine, and, based at least in part on the input signals 134, generate and transmit a plurality of output signals 136 to actuators within the diesel vehicle and/or its diesel engine.

At least one of the output signals 136 can be a control signal transmitted to the valve 108 to instruct and/or cause the valve 108 to open and/or close, and at least one of the output signals 136 can be a control signal transmitted to the solenoid actuator 130 (or all solenoid actuators of a CDA system) to instruct and/or cause the solenoid actuator 130 (or all solenoid actuators of a CDA system) to mechanically connect and/or disconnect the first camshaft 126 to/from the inlet valve seat 122 (or to/from all of the inlet valve seats 122). At least one of the output signals 136 can be a control signal transmitted to a light or other indicator on a dashboard of the diesel vehicle to instruct and/or cause the indicator to indicate to a driver of the vehicle that an overspeed or runaway event has been detected and/or that CDA has been activated to prevent, interrupt, or otherwise mitigate or remedy such an event. At least one of the input signals 134 can be a signal indicative of a torque currently requested by the driver of the vehicle, or of a status of the accelerator or gas pedal of the vehicle. At least one of the input signals 134 can be a signal indicative of a torque currently produced by the diesel engine. At least one of the input signals 134 can be a signal indicative of current speed of the diesel engine in revolutions per minute (rpm).

Figure 2:
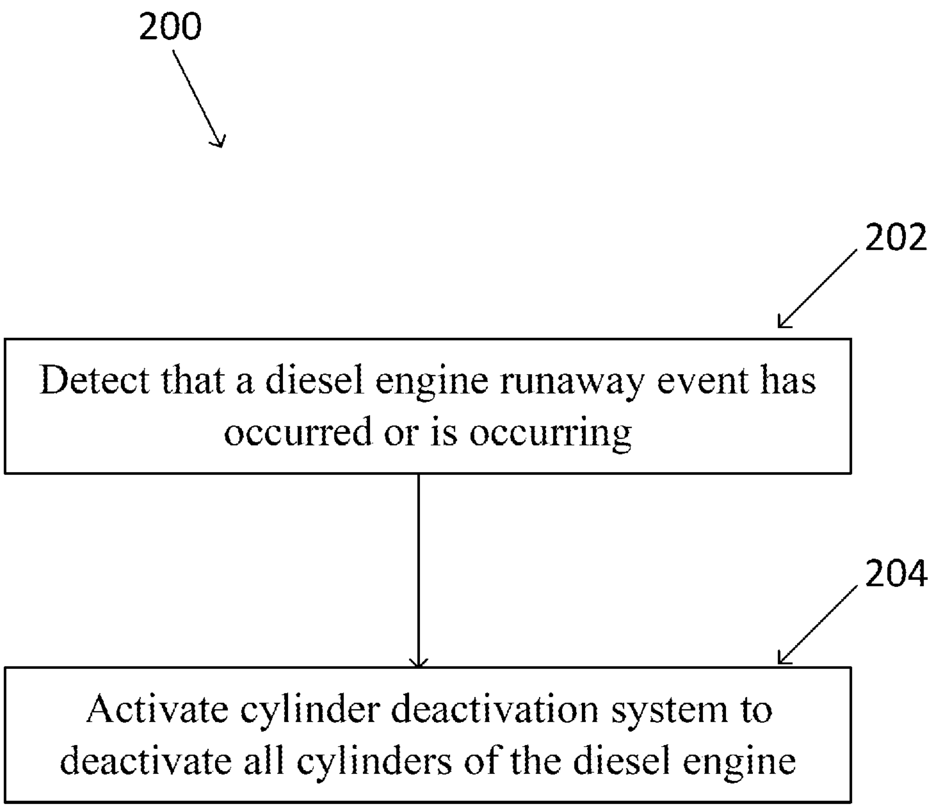
FIG. 2 illustrates a method of using components of a diesel vehicle.

FIG. 2 illustrates a method 200 of mitigating a diesel engine runaway event in a diesel vehicle. As illustrated in FIG. 2, the method 200 includes detecting, at 202, that a diesel engine runaway event has occurred or is occurring. In some embodiments, this can be done by an engine control unit comparing a torque requested by a driver of the diesel engine (e.g., as measured by a degree to which the driver has pressed the gas pedal) to a torque generated by the diesel engine. If the difference between these two is above a predetermined threshold, then it can be determined that a diesel engine runaway event is occurring. In other embodiments, this can be done by an engine control unit comparing an expected speed of the diesel engine to an actual current speed of the diesel engine, such as in revolutions per minute. If the difference between these two is above a predetermined threshold, then it can be determined that a diesel engine runaway event is occurring. Such a predetermined threshold may be 50 rpm, 100 rpm, 150 rpm, 200 rpm, etc. In other embodiments, this can be done by an engine control unit checking an idle speed of the diesel engine (e.g., when the diesel engine is idling, the vehicle is not in gear, the gas pedal is at rest, and/or no torque is being requested), such as in revolutions per minute. If the idle speed of the engine is above a predetermined threshold, then it can be determined that a diesel engine runaway event is occurring. Such a predetermined threshold may be 700 rpm, 800 rpm, 900 rpm, or 1000 rpm, etc.

As illustrated in FIG. 2, the method 200 further includes, upon detecting that a diesel engine runaway event has occurred or is occurring, and because of the detection of the diesel engine runaway event, activating, at 204, a CDA system to deactivate all cylinders of the diesel engine and deactivating all cylinders of the diesel engine, thereby cutting off the supply of air and/or fuel or other combustible substance to each of the cylinders of the diesel engine by ensuring that the all of the inlet valves of each of the cylinders remain closed, and such that zero cylinders of the diesel engine remain active or firing. In some embodiments, this can be done by an engine control unit outputting a control signal and transmitting the control signal to solenoid actuator(s) of the CDA system to instruct and/or cause the solenoid actuator(s) 130 to mechanically disconnect a camshaft from inlet valve seat(s) of the cylinder(s) of the diesel engine. In some embodiments, the method may also include the engine control unit outputting a control signal and transmitting the control signal to an indicator of the diesel vehicle to instruct and/or cause the indicator to indicate to the driver of the diesel vehicle that an overspeed or runaway event has been detected and/or that CDA has been activated to prevent, interrupt, or otherwise remedy such an event. Upon recognition of such an indicator, the driver may be able to move the diesel vehicle, such as by coasting, to a less dangerous location.

Advantages of the technologies described herein include protection of engine mechanical components, increased safety for vehicle occupants and the public, and improved compliance with rules at refineries or other locations where there is an elevated risk of diesel engine runaway events. Furthermore, in diesel engines that include CDA technologies for reducing NOx emissions or other purposes, these additional advantages can be provided without any additional mechanical components or costs.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method, comprising:

detecting a diesel engine runaway event in a diesel engine; and in response to detecting the diesel engine runaway event, deactivating cylinders of the diesel engine, wherein detecting a diesel engine runaway event in a diesel engine includes comparing, by an engine control unit, a torque requested of the diesel engine to a torque generated by the diesel engine.

2. The method of claim 1, wherein deactivating cylinders of the diesel engine includes deactivating all cylinders in the diesel engine such that no combustion occurs in any cylinders of the diesel engine and no cylinders of the diesel engine produce power.

3. The method of claim 1, wherein deactivating cylinders of the diesel engine includes mechanically deactivating the cylinders of the diesel engine.

4. The method of claim 3, wherein deactivating cylinders of the diesel engine includes mechanically decoupling a camshaft of the diesel engine from inlet valves of the cylinders of the diesel engine.

5. The method of claim 4, wherein deactivating cylinders of the diesel engine includes mechanically decoupling a camshaft of the diesel engine from inlet valve seats of the cylinders of the diesel engine.

6. The method of claim 1, wherein deactivating cylinders of the diesel engine includes deactivating solenoid valves of the cylinders of the diesel engine.

7. The method of claim 6, further comprising:

prior to detecting the diesel engine runaway event in the diesel engine, deactivating solenoid valves of a subset of the cylinders of the diesel engine to increase a temperature of an exhaust gas leaving the diesel engine.

8. The method of claim 1, wherein deactivating cylinders of the diesel engine prevents flow of air into combustion chambers of the cylinders.

9. The method of claim 8, wherein deactivating cylinders of the diesel engine prevents flow of air into combustion chambers of the cylinders at openings in walls of the combustion chambers.

10. The method of claim 8, wherein deactivating cylinders of the diesel engine prevents flow of air from an intake manifold into combustion chambers of the cylinders.

11. The method of claim 1, further comprising, in response to detecting the diesel engine runaway event, indicating to a driver that the diesel engine runaway event has been detected and that cylinders of the diesel engine have been deactivated.

12. A heavy-duty truck, comprising:

a diesel engine; and an engine control unit configured to detect a diesel engine runaway event in the diesel engine and, in response to detection of the diesel engine runaway event, deactivate cylinders of the diesel engine, wherein the engine control unit is configured to detect a diesel engine runaway event in the diesel engine by comparing a torque requested of the diesel engine to a torque generated by the diesel engine.

13. The heavy-duty truck of claim 12, wherein the engine control unit is configured to, in response to detection of the diesel engine runaway event, deactivate all cylinders in the diesel engine such that no combustion occurs in any cylinders of the diesel engine and no cylinders of the diesel engine produce power.

14. The heavy-duty truck of claim 12, wherein the engine control unit is configured to, in response to detection of the diesel engine runaway event, mechanically decouple a camshaft of the diesel engine from inlet valves of the cylinders of the diesel engine.

15. The heavy-duty truck of claim 12, wherein the engine control unit is configured to, in response to detection of the diesel engine runaway event, prevent flow of air from an intake manifold into combustion chambers of the cylinders.

* * * * *